Nov. 10, 1964   L. D. ZEPERNICK   3,156,422
HALF SHELL COIL WINDING MACHINE
Filed Dec. 3, 1962   2 Sheets-Sheet 1

Lawrence D. Zepernick
INVENTOR.

BY Bertram H. Mann
ATTORNEY

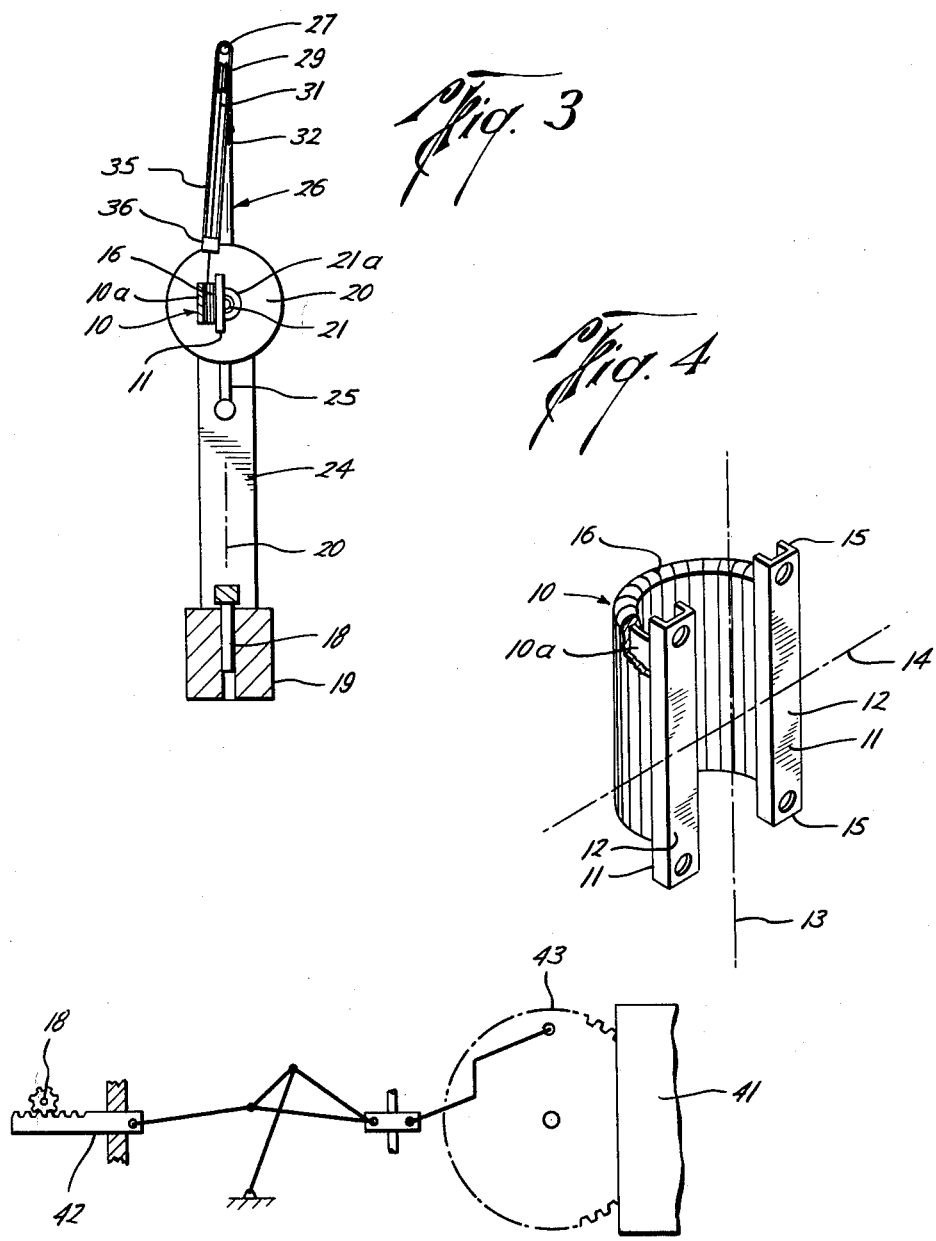

3,156,422
HALF SHELL COIL WINDING MACHINE
Lawrence D. Zepernick, Houston, Tex., assignor to Vector Cable Company, Houston, Tex., a corporation of Texas
Filed Dec. 3, 1962, Ser. No. 241,660
5 Claims. (Cl. 242—9)

This invention relates to means for winding half-shell or half-cylinder cores with wire coils to provide transducer parts which can be combined to form a toroidal transducer.

In a co-pending application, Serial No. 206,776, filed July 2, 1962, in the name of the present applicant, there is illustrated a sectional magnetostrictive transducer which is detachably mounted on a cable to be suspended in a well for use in well logging operations or in any fluid medium, such as the sea. The transducer is formed of half-shells or half-cylinders of magnetostrictive material which are individually wound with wire then secured together about the cable and suitably encased. While machines have been suggested for winding coils about tubular cores, applicant is not aware of any relatively simple machine which will rapidly and accurately wind a half-shell core, of the type disclosed in the mentioned co-pending application.

Accordingly, an object of the present invention is to provide a novel coil-winding machine which is especially adaptable for winding half-shell transducer elements.

This object and other more detailed objects hereafter appearing are attained by the present invention which involves, generally, a conductor wire storage reel stationarily mounted substantially coaxially with respect to a rotating wire guide arm. A support is mounted beyond the end of the reel and has a core mounting bracket. This support is mounted for rotation about an axis which is normal to the axis of the reel. Means are provided for rotating the arm about its axis so that a conductor wire can be supplied via the wire guide arm from the reel and wound upon the core in an accurate manner as the support is rotated.

In the accompanying drawings which illustrate the invention,

FIG. 3 is a front view and section taken substantially on line 3—3 of FIG. 1.

FIG. 4 is a perspective view of one of the half-shell transducer elements.

FIG. 5 is a view of linkage mechanism.

Figure 1:
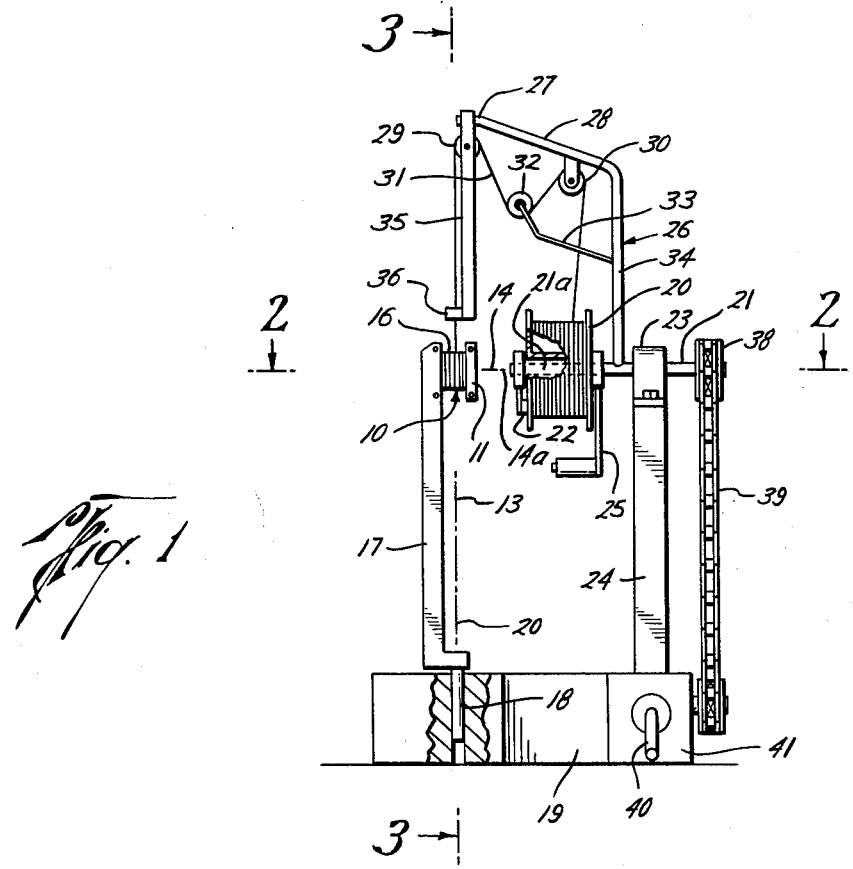
FIG. 1 is a side view of the machine.
Figure 2:
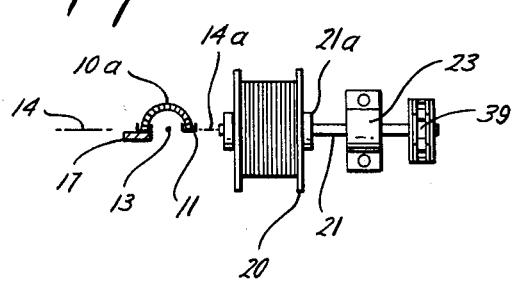
FIG. 2 is a top view and horizontal section of the machine taken along line 2—2 of FIG. 1.

Referring to FIGS. 1-3 of the drawings, apparatus is shown for winding a transducer element 10 as shown in FIG. 4. The element 10 generally includes a semi-tubular member or tubular half-shell 10a of magnetostrictive material with U-shaped end pieces 11 of magnetically conductive material attached to the end faces of the half-shell member. The outer faces 12 of the end pieces 11 lie in a common plane which also extends through a central axis 13 for element 10 and base member 10a. A perpendicular axis 14 which bisects the length of the element also lies in the common plane. End pieces 11 have extensions 15 at both ends provided with bolt holes so that like elements 10 may be secured to one another to form a tubular magnetostrictive transducer. Wire 16 is wound in layers about the semi-tubular base member so that when an electrical current passes therethrough, the transducer is activated in a well-known manner. The present invention is concerned with the winding of wire on such a semi-tubular base member 10a.

Referring now to FIGS. 1-3, the end piece 11 of a base member 10a is attached to the upper end of a vertical support 17, the lower end of the support having a vertical pin 18 rotatably mounted in a socket in a base member 19. The pivot axis 20 of the pin 18 is offset relative to the support 17 so as to be common with the axis 13 of the base member 10a when it is secured to the support. Hence, rotation of the support 17 about the pivot axis 20 of the pivot pin rotates the base member 10a about its central axis 13.

Means to wind wire on the semi-tubular base member 10a includes a supply spool of wire 20 rotatably mounted on a sleeve 21a itself rotatable on a spindle 21 which has its central axis 14a coextensive with the perpendicular axis 14 of the base member 10a on the support. Sleeve 21a has a friction braking arm 22 and a counterweight arm 25 to normally prevent rotation of the spool 20 so that the wire 31, when pulled from the spool 20, rotates the spool against the friction drag of the brake. The friction drag thus provides a tension on the wire.

Spindle 21 is rotatably mounted in a bearing 23 in a vertical post 24 and also has an outwardly disposed wire guiding arm 26 attached thereto. The guiding arm 26 extends radially from the spindle and then transversely so that its end 27 is disposed radially outwardly from the semi-tubular base member 10a. The transverse portion 28 of the arm has spaced pulleys 29, 30, the pulley 29 on the outer end of the arm being arranged to guide the wire 31 to the base member 10a. A pulley 32 is disposed intermediate of pulleys 29 and 30 by a spring arm 33 attached to the vertical portion 34 of the arm. Pulley 32 and arm 33 serve to take up slack in the wire between the base member 10a and the spool 20. Slack in the wire occurs because of the elongated shape of shell 10a and wire is withdrawn from spool 20 at a non-uniform rate, hence, pulley 32 and arm 33 are capable of considerable pivotal motion to compensate for such slack. To insure proper feeding of the wire to the base member 10a, an arm 35 with an eyelet 36 is provided on the end 27 of the transverse portion of the arm to guide the wire 31 between the pulley 29 and base member 10a.

The spindle 21 is rotated about its axis 14a by a drive mechanism which includes sprocket gears 38, a chain 39 and a hand crank 40 operating through a gear box 41.

The operation of the apparatus is as follows: an end piece 11 of a semi-tubular base member 10a is attached to the pivoted support 17 and the wire 31 threaded through the pulleys 29, 30, 32 and eyelet 36 and attached to the base member, for example, by a few wraps about the base member. The support 17 is pivoted until the end of base member 10a near end piece 11 is aligned with the plane perpendicular to axis 14 and including axis 13. Hand crank 40 is operated to rotate the spindle 21 about axis 14a thereby winding wire 31 on the base member 10a while pulling wire 31 from the spool 20. The wire is applied perpendicular to axis 14. As the wire 31 is applied to base member 10a, the support 17 is hand rotated so that an even layer of wire is applied to the base member. After one layer is applied, the rotation of the support is reversed and another layer of wire applied. This operation is repeated until the desired number of turns of wire are applied to the base member.

While the speed of rotation of support 17 relative to the speed of applying wire to base member 10a requires judgment on the part of the operator, experience has shown that very level layers of wire can be wound in this manner. It should, however, be easily appreciated that the reciprocating rotation of the support may easily be geared to the rotation of the hand chank for automatic operation. For example, as shown in FIG. 5, a well-known mechanism can be connected between the pin 18 and gear box 41 to impart a uniform reciprocating motion to a rack gear 42 from a rotating gear 43 in the gear train. Hence, the oscillating motion of the base member 10a can be correlated with the rotative motion of the arm to provide a level winding of wire on the base member 10a.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

I claim:

1. An apparatus for winding wire on a coil core having an axis of curvature comprising a support,
   a spindle carried for rotation about a first axis by said support,
   a wire supply reel rotatably mounted on said spindle,
   means for resisting rotation of said reel relative to said support,
   wire guide means projecting radially from said spindle and rotatably therewith about said reel,
   means in line with said spindle for rotatably supporting a coil core about a second axis normal to and intersecting said first axis so that the axis of curvature for the coil core is aligned with said second axis,
   means for rotating said spindle and said wire guide means to unwind wire threaded through said guide means from said reel and to wind said wire upon a core on said supporting means, and
   slack control means on said wire guide means for maintaining said wire taut between said core and said reel, said slack control means being spring biased and operable independently of centrifugal forces developed by the movement of said wire guide means about said wire supply reel.

2. Apparatus for winding wire on a tubular half-shell member having longitudinally extending flat end surfaces lying in a common plane in which its axis of curvature also lies comprising:
   rotatable support means for mounting said half-shell member at one of said end surfaces and for rotation of said half-shell member about its axis of curvature,
   means mounted for rotation about said half-shell member for applying wire in a coil about said half-shell member,
   said support means being postioned relative to said wire applying means so that the point of application of wire on said member is offset from said common plane, and
   spring biasing means mounted on said wire applying means for preventing slack in the wire being coiled about said half-shell member.

3. Apparatus for winding wire on a semi-cylindrical core member comprising,
   first means for supporting a wire supply reel about a first axis,
   second means for supporting a core member rotatably about a second axis normal to and intersecting said first axis so that the axis of curvature for a core member is aligned with said second axis, and
   wire guide means mounted for rotation about said first axis and about a core member on said second means for withdrawing wire from a wire supply reel and applying such wire to a core member in a plane normal to said first axis.

4. Apparatus for winding wire on a semi-cylindrical core member comprising,
   first means for supporting a wire supply reel about a first axis,
   second means for supporting a core member rotatably about a second axis normal to and intersecting said first axis so that the axis of curvature for a core member is aligned with said second axis,
   wire guide means mounted for rotation about said first axis and about a core member on said second means for withdrawing wire from a wire supply reel and applying such wire to a core member in a plane normal to said first axis,
   said wire guide means including guide rollers, and
   spring biasing means acting on at least one of said guide rollers independent of centrifugal force developed when the wire guide means is rotated about said first axis for maintaining a consistent tension on a section of wire between a wire supply reel and a core member.

5. Apparatus for winding wire on a semi-cylindrical core member having an axis of curvature comprising,
   a reel carrying a supply of wire,
   first means for supporting said reel about a first axis,
   second means for supporting a core member rotatably about a second axis normal to and intersecting said first axis so that said axis of curvature for said core member is aligned with said second axis, and
   wire guide means mounted for rotation about said first axis and about said core member on said second means for withdrawing wire from said wire supply reel and applying such wire to said core member in a plane normal to said first axis.

References Cited in the file of this patent

UNITED STATES PATENTS

| 2,773,651 | Whipple | Dec. 11, 1956 |
| 2,860,220 | Keeler | Nov. 11, 1958 |

FOREIGN PATENTS

| 233,973 | Australia | Mar. 3, 1960 |